（12）United States Patent
Pei et al.

(10) Patent No.: US 11,987,937 B1
(45) Date of Patent: May 21, 2024

(54) AIRFLOW-ENHANCED EMBANKMENT VENTILATION STRUCTURE, COMPOSITE EMBANKMENT STRUCTURE, AND CONSTRUCTION METHOD THEREOF

(71) Applicant: Northwest Institute of Eco-Environment and Resources, Chinese Academy of Sciences, Lanzhou (CN)

(72) Inventors: Wansheng Pei, Lanzhou (CN); Shuai Du, Lanzhou (CN); Mingyi Zhang, Lanzhou (CN); Chong Wang, Lanzhou (CN)

(73) Assignee: NORTHWEST INSTITUTE OF ECO-ENVIRONMENT AND RESOURCES, CHINESE ACADEMY OF SCIENCES, Lanzhou (CN)

( * ) Notice: Subject to any disclaimer, the term of this patent is extended or adjusted under 35 U.S.C. 154(b) by 0 days.

(21) Appl. No.: 18/384,388

(22) Filed: Oct. 27, 2023

(30) Foreign Application Priority Data

Jan. 17, 2023 (CN) .......................... 202310063829.5

(51) Int. Cl.
*E01C 3/06* (2006.01)
*E01C 1/00* (2006.01)
*E01C 7/14* (2006.01)

(52) U.S. Cl.
CPC ................ *E01C 1/005* (2013.01); *E01C 3/06* (2013.01); *E01C 7/14* (2013.01)

(58) Field of Classification Search
CPC ............... E01C 1/005; E01C 3/06; E01C 7/14
See application file for complete search history.

(56) References Cited

FOREIGN PATENT DOCUMENTS

| CA | 2335417 A1 | 8/2001 |
| CN | 101289830 A | 10/2008 |
| CN | 101481899 A | 7/2009 |
| CN | 102126348 A | 7/2011 |
| CN | 102692101 A | 9/2012 |
| CN | 203349584 U | 12/2013 |

(Continued)

OTHER PUBLICATIONS

Dong Jianhua, et al., Proposal of the permafrost slope supporting structure with framed ventilation anchor pipe and preliminary study on its ventilation effect, China Civil Engineering Journal, 2018, pp. 101-110, vol. 51, No. 12.

(Continued)

*Primary Examiner* — Gary S Hartmann
(74) *Attorney, Agent, or Firm* — Bayramoglu Law Offices LLC (57) ABSTRACT

A composite embankment structure includes an embankment, an airflow-enhanced embankment ventilation structure, and a heat pipe system. The embankment includes an embankment filler layer, a ventilation slab lower leveling layer, a ventilation slab upper cushion, and a pavement structure layer arranged in sequence from bottom to top. The ventilation slab in the airflow-enhanced embankment ventilation structure is arranged between the ventilation slab lower leveling layer and the ventilation slab upper cushion. The heat pipe system includes a heat pipe, and one end of the heat pipe is inserted into the embankment from an embankment slope and is located under the ventilation slab.

20 Claims, 4 Drawing Sheets

(56) References Cited

FOREIGN PATENT DOCUMENTS

| CN | 203668785 | U | | 6/2014 |
|---|---|---|---|---|
| CN | 104480823 | A | | 4/2015 |
| CN | 205399114 | | * | 7/2016 |
| CN | 205399115 | | * | 7/2016 |
| CN | 106415146 | A | | 2/2017 |
| CN | 107034756 | A | | 8/2017 |
| CN | 107201705 | A | | 9/2017 |
| CN | 108179669 | | * | 6/2018 |
| CN | 108330748 | A | | 7/2018 |
| CN | 108411727 | | * | 8/2018 |
| CN | 207798720 | U | | 8/2018 |
| CN | 108589456 | A | | 9/2018 |
| CN | 208151790 | U | | 11/2018 |
| CN | 110777592 | | * | 2/2020 |
| CN | 210319020 | | * | 4/2020 |
| CN | 210439092 | | * | 5/2020 |
| CN | 214938894 | | * | 11/2021 |
| CN | 113756280 | | * | 12/2021 |
| CN | 215164243 | U | | 12/2021 |
| CN | 115563679 | A | | 1/2023 |
| CN | 116005506 | | * | 4/2023 |
| CN | 219862154 | | * | 10/2023 |
| CN | 117051635 | | * | 11/2023 |
| DE | 29604750 | U1 | | 5/1996 |
| JP | 2000001804 | A | | 1/2000 |
| JP | 2007270487 | A | | 10/2007 |
| RU | 1781372 | C | | 12/1992 |
| RU | 2720546 | C1 | | 5/2020 |

OTHER PUBLICATIONS

Zhang Kun, et al., Cooling effect of ventilated experimental embankment of Qinghai-Tibet high-grade road, Journal of Zhejiang University (Engineering Science), 2010, pp. 1845-1850, vol. 44, No. 10.

Zhu Dong-Peng, et al., Analysis on Heat Transfer Characteristics of Highway Duct-ventilated Embankment in High Temperature Permafrost Regions, China Journal of Highway and Transport, 2015, pp. 69-77, vol. 28, No. 12.

* cited by examiner

AIRFLOW-ENHANCED EMBANKMENT VENTILATION STRUCTURE, COMPOSITE EMBANKMENT STRUCTURE, AND CONSTRUCTION METHOD THEREOF

CROSS REFERENCE TO THE RELATED APPLICATIONS

This application is based upon and claims priority to Chinese Patent Application No. 202310063829.5, filed on Jan. 17, 2023, the entire contents of which are incorporated herein by reference.

TECHNICAL FIELD

The present disclosure belongs to the technical field of road construction, and in particular to an airflow-enhanced embankment ventilation structure, a composite embankment structure, and a construction method for the composite embankment structure.

BACKGROUND

China is the third largest permafrost country in the world, the area of permafrost accounts for about 21.5% of the national territorial area, and physical and mechanical properties of the permafrost are particularly sensitive to temperature changes. In recent years, with global warming, regional permafrost degradation is remarkable, and freeze-thaw diseases of road engineering in permafrost regions occur frequently. For high-grade roads in permafrost regions, due to the strong thermal effect of high-grade road pavement with large width, strong heat absorption of black asphalt pavement and high heat storage of thick pavement structure, the thermal disturbance to the underlying permafrost is greater, and it is extremely difficult to control the freeze-thaw deformation of the roads. However, as the existing heat pipe and composite embankment are limited by their cooling range and affected by the remarkable on-way energy attenuation in the ventilation slab in the road with ventilation slab, the differential deformation of various roads is still obvious, which is difficult to meet the high standard requirements of high-grade roads.

SUMMARY

A main objective of the present disclosure is to provide an airflow-enhanced embankment ventilation structure, a composite embankment structure, and a construction method for the composite embankment structure, so as to overcome disadvantages in the prior art.

In order to achieve the objective above, the technical solution adopted by the present disclosure is as follows:

The present disclosure provides an airflow-enhanced embankment ventilation structure, including:
  a ventilation slab, arranged in an embankment and including more than one airflow-enhanced ventilation hole, where the airflow-enhanced ventilation hole includes a ventilation hole body arranged in a first direction, a diameter of the ventilation hole body decreases in a designated direction, and the ventilation hole body includes a horn end, a first acceleration section and a first smooth section arranged in sequence in the designated direction, and the designated direction is a direction from a prevailing wind direction side to a weak wind side of the embankment; and
  a negative pressure air suction device, arranged on the weak wind side of the embankment and communicating with the ventilation hole body.

Further, the ventilation hole body specifically includes a horn end, a first acceleration section, a first smooth section and a second acceleration section arranged in sequence in a designated direction.

Preferably, the ventilation hole body specifically includes a horn end, a first acceleration section, a first smooth section, a second acceleration section and a second smooth section arranged in sequence in the designated direction.

Further, the designated direction is perpendicular to a road driving direction.

Further, the first acceleration section and the second acceleration section are of unequal wall thicknesses, but the first acceleration section and the first smooth section are of an equal wall thickness.

Further, the horn end of the ventilation hole body and the negative pressure air suction device are exposed from the prevailing wind direction side and the weak wind side of the embankment, respectively.

Further, the ventilation slab is arranged in the embankment in a horizontal direction and is distributed at a position under a cement stabilized layer of a pavement structure.

Further, the negative pressure air suction device includes a wind-driven hood and a ventilation pipe. One end of the ventilation pipe communicates with the ventilation hole body, and the other end of the ventilation pipe is provided with the wind-driven hood. The wind-driven hood is higher than a pavement.

The present disclosure further provides a composite embankment structure, including an embankment, the airflow-enhanced embankment ventilation structure above, and a heat pipe system.

The embankment includes an embankment filler layer, a ventilation slab lower leveling layer, a ventilation slab upper cushion and a pavement structure layer arranged in sequence from bottom to top.

A ventilation slab in the airflow-enhanced embankment ventilation structure is arranged between the ventilation slab lower leveling layer and the ventilation slab upper cushion.

The heat pipe system includes more than one heat pipe, one end of the heat pipe is inserted into an embankment from an embankment slope and located under the ventilation slab.

Further, the heat pipe includes an evaporation section and a condensation section connected in sequence. The evaporation section is wrapped inside the embankment, and the condensation section is exposed outside the embankment.

Further, the condensation section of the heat pipe extends from a slope of the embankment at a prevailing wind direction side or a weak wind side.

The present disclosure further provides a construction method for a composite embankment structure. The method includes the following steps:
  filling an embankment filler layer;
  laying a ventilation slab lower leveling layer on the embankment filler layer;
  assembling a prefabricated ventilation slab on the ventilation slab lower leveling layer;
  laying a ventilation slab upper cushion and a pavement structure layer on the ventilation slab in sequence; and
  arranging a negative pressure air suction device in cooperation with the ventilation slab to form the airflow-enhanced embankment ventilation structure above.

Further, the construction method for the composite embankment structure further includes the following steps:

inserting one end of more than one heat pipe into an embankment from an embankment slope and under the ventilation slab.

Further, the method further includes a step of prefabricating and curing the ventilation slab:

building a ventilation slab casting formwork, then installing a forming pipeline of an airflow-enhanced ventilation hole in the ventilation slab casting formwork, and then casting and curing a ventilation slab unit body on the formwork.

Compared with the prior art, the present disclosure has the following beneficial effects:

(1) The airflow-enhanced embankment ventilation structure provided by the present disclosure is composed of a ventilation slab with a variable cross-section ventilation hole and a negative pressure air suction device, which is used to strengthen an airflow velocity in a ventilation pipe, reduce the on-way energy attenuation in the ventilation pipe, eliminate uneven cooling along the ventilation pipe, and reduce uneven lateral deformation of the road.

(2) The airflow-enhanced ventilation hole in the airflow-enhanced embankment ventilation structure is used for improving the overall cooling intensity and cooling effect of the embankment. In a prevailing wind direction season, cold energy enters from the horn end of the airflow-enhanced ventilation hole and reaches the first acceleration section. At this time, the diameter of the airflow-enhanced ventilation hole decreases gradually, the on-way energy dissipation after the ambient low-temperature airflow enters the airflow-enhanced ventilation hole is reduced, and the airflow velocity is gradually increased, thus improving the forced convection heat exchange capacity and weakening the uneven cooling caused by the on-way energy dissipation. Meanwhile, the airflow-enhanced ventilation hole is connected to the negative pressure air suction device, the negative pressure air suction device is composed of a wind-driven hood and the ventilation pipe. Generally, the hood is arranged on the pavement, thus enhancing the forced convection cooling effect of the airflow in the ventilation hole of the ventilation plate.

(3) The arrangement of the smooth section in the airflow-enhanced embankment ventilation structure can increase the internal and external heat exchange area of the ventilation slab to strengthen the working efficiency of the ventilation slab. In addition, multiple smooth sections are arranged at intervals along the ventilation slab, which can further increase the internal and external heat exchange area of the ventilation slab and strengthen the working efficiency of the ventilation slab. Meanwhile, the arrangement of the smooth section increases the length of airflow-enhanced ventilation hole, which makes the ventilation slab adapt to the composite embankment with a large width distance and the application scope of the ventilation slab wider.

(4) According to the composite embankment structure provided by the present disclosure, the advantages of resisting differential deformation of the embankment and improving the stiffness of the embankment are improved through the ventilation slab, and the heat pipe system is used to control thaw settlement in the middle of a wide embankment and reduce deep thaw settlement deformation of a permafrost embankment. The problem that the position where the ventilation slab cannot be accurately arranged in the existing ventilation slab arrangement method is solved, the close contact between the embankment and the ventilation slab is achieved, and the problem of uneven embankment deformation caused by the existing ventilation slab installation technology is overcome.

(5) During the operation of the heat pipe in the composite embankment structure, a condensation medium in the evaporation absorbs heat for evaporation, and the condensation medium after absorbing heat and evaporation becomes gaseous, and flows to the condensation section, and exchanges heat with the outside at the condensation section, thus cooling the embankment. By inserting a straight pipe in an inclined manner or using an L-shaped heat pipe, the refrigeration at the middle part of the embankment can be strengthened, the thaw settlement in the middle part of the embankment can be reduced, and the creep deformation of deep permafrost can be inhibited.

(6) The arrangement of multiple heat pipes in the composite embankment structure of the present disclosure can increase the strength of adjusting the shady embankment through the heat pipes, improve the adjustment efficiency, and is more conducive to the uniform temperature distribution inside the embankment.

BRIEF DESCRIPTION OF THE DRAWINGS

To describe the technical solutions in the embodiments of the present disclosure or in the prior art more clearly, the following briefly introduces the accompanying drawings required for describing the embodiments or the prior art. Apparently, the accompanying drawings in the following description show merely some embodiments of the present disclosure, and those of ordinary skill in the art may still derive other drawings from these accompanying drawings without creative efforts.

In the drawings: 100—airflow-enhanced ventilation hole; 10—ventilation hole body; 11—first acceleration section; 12—second acceleration section; 13—smooth section; 14—horn end; 21—ventilation pipe; 22—wind-driven hood; 200—heat pipe; 300—embankment; 310—prevailing wind direction side; 320—weak wind side; 330—first layer of embankment filler; 340—ventilation slab lower leveling layer; 350—ventilation slab upper cushion; 360—pavement structure layer; 1000—ventilation slab; 2000—earth surface.

DETAILED DESCRIPTION OF THE EMBODIMENTS

In view of the shortcomings of the prior art, the inventors of this case, through long-term research and a lot of practice, have developed a composite embankment structure in order to weaken the vertical strong heat flow disturbance of the embankment under the "wide, thick and black" thermal blanket effect, reduce the large deformation caused by thaw settlement of the road, and improve the differential deformation resistance of the wide road. The core of the composite embankment structure is to arranged a transverse ventilation slab at a lower part of a pavement subbase, which not only can block the vertical strong heat flow disturbance of the pavement structure layer in warm season, but also can cool the embankment through forced convection in cold season, and enhance the stiffness of the pavement structure layer to effectively resist the differential deformation of the wide roads. Meanwhile, to reduce the large deformation caused by large thaw-settlement deformation caused by deep permafrost degradation, the L-shaped heat pipe is arranged at the lower part of the embankment slope or a heat pipe is buried in an inclined manner at the lower part of the embankment slope. The technical solution, its implementation process and principle are further explained and described below.

One aspect of the present disclosure provides an airflow-enhanced embankment ventilation structure, including:

- a ventilation slab, arranged in an embankment and including more than one airflow-enhanced ventilation hole, where the airflow-enhanced ventilation hole includes a ventilation hole body arranged in a first direction, a diameter of the ventilation hole body decreases in a designated direction, and the ventilation hole body includes a horn end, a first acceleration section and a first smooth section arranged in sequence in the designated direction, and the designated direction is a direction from a prevailing wind direction side to a weak wind side of the embankment; and
- a negative pressure air suction device, arranged on the weak wind side of the embankment and communicating with the ventilation hole body.

In some preferred embodiments, the ventilation hole body specifically includes a horn end, a first acceleration section, a first smooth section and a second acceleration section arranged in sequence in a designated direction.

In some more preferred embodiments, the ventilation hole body specifically includes a horn end, a first acceleration section, a first smooth section, a second acceleration section, and a second smooth section arranged in sequence in a designated direction. A caliber of the horn end is denoted as d0, a minimum caliber of the first acceleration section is denoted as d1, a caliber of the first smooth section is denoted as d1, a minimum caliber of the second acceleration section is denoted as d2, a caliber of the second smooth section is denoted as d2, a length of the first acceleration section is denoted as l1, a length of the first smooth section is denoted as l2, a length of the second acceleration section is denoted as l3, a length of the second smooth section is denoted as l4, and a length and a caliber of any position of the ventilation hole body are denoted as l and d, respectively, and d and l satisfy the following relationship:

$$d = \begin{cases} d0 - \frac{(d0-d1)l}{l1}, & (0 \le l \le l1) \\ d1, & (l1 \le l < l1+l2) \\ d1[l - (l1+l2)]\frac{(d1-d2)}{l3}, & (l1+l2 \le l < l1+l2+l3) \\ d2, & (l1+l2+l3 \le l \le l1+l2+l3+l4) \end{cases}$$

In some preferred embodiments, the designated direction is perpendicular to a road driving direction.

In some preferred embodiments, the first acceleration section and the second acceleration section are of unequal wall thicknesses, but the first acceleration section and the first smooth section are of equal wall thickness. The wall thickness is determined according to a thickness and caliber of the ventilation slab. The thickness of the ventilation slab is unchanged, but the caliber varies, so the wall thickness varies. By changing the caliber, the on-way wind speed loss can be reduced and the airflow velocity can be enhanced. However, by providing the smooth section, the caliber and wall thickness remain unchanged, which is convenient for construction.

In some preferred embodiments, the horn end of the ventilation hole body and the negative pressure air suction device are exposed from a prevailing wind direction side and a weak wind side of the embankment, respectively.

In some preferred embodiments, the ventilation slab is arranged in the embankment in a horizontal direction and distributed at a position under a cement stabilized layer of a pavement structure.

In some preferred embodiments, the ventilation slab includes multiple airflow-enhanced ventilation holes arranged at intervals in a direction perpendicular to the designated direction, and a spacing between the adjacent airflow-enhanced ventilation holes is from 0.25 m to 0.5 m.

In some preferred embodiments, the negative pressure air suction device includes a wind-driven hood and a ventilation pipe. One end of the ventilation pipe communicates with the ventilation hole body, and the other end of the ventilation pipe is provided with the wind-driven hood. The wind-driven hood is higher than a pavement.

Another aspect of the present disclosure further provides a composite embankment structure, including an embankment, the airflow-enhanced embankment ventilation structure above, and a heat pipe system.

The embankment includes an embankment filler layer, a ventilation slab lower leveling layer, a ventilation slab upper cushion and a pavement structure layer arranged in sequence from bottom to top.

A ventilation slab in the airflow-enhanced embankment ventilation structure is arranged between the ventilation slab lower leveling layer and the ventilation slab upper cushion.

The heat pipe system includes more than one heat pipe, one end of the heat pipe is inserted into an embankment from an embankment slope and located under the ventilation slab.

In some embodiments, the heat pipe includes an evaporation section and a condensation section connected in sequence. The evaporation section is wrapped inside the embankment, and the condensation section is exposed outside the embankment.

In some preferred embodiments, the heat pipe system includes multiple heat pipes arranged at intervals in a direction perpendicular to a designated direction, and a spacing between the adjacent heat pipes is from 2.0 m to 4.0 m. The direction perpendicular to the designated direction is a pavement extending direction.

In some preferred embodiments, the heat pipe may include, but is not limited to, an inclined inserting-type heat pipe or an L-shaped heat pipe.

In some preferred embodiments, the condensing section of the heat pipe extends from a slope of the embankment at a prevailing wind direction side or a weak wind side.

The embodiment of the present disclosure further provides a construction method for the composite embankment structure. The method includes the following steps:

filling an embankment filler layer;
laying a ventilation slab lower leveling layer on the embankment filler layer;
assembling a prefabricated ventilation slab on the ventilation slab lower leveling layer;
laying a ventilation slab upper cushion and a pavement structure layer on the ventilation slab in sequence; and arranging a negative pressure air suction device in cooperation with the ventilation slab to form the airflow-enhanced embankment ventilation structure above.

In some preferred embodiments, the construction method for the composite embankment structure further includes the following steps:

inserting one end of more than one heat pipe into an embankment from an embankment slope and under the ventilation slab.

In some preferred embodiments, the method further includes a step of prefabricating and curing the ventilation slab:

building a ventilation slab casting formwork, then installing a forming pipeline of an airflow-enhanced ventilation hole in the ventilation slab casting formwork, and then casting and curing a ventilation slab unit body on the formwork.

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

EMBODIMENT

Permafrost is a special type of rock and soil that has a temperature of 0° C. or below and contains ice, and its physical and mechanical properties are sensitive to the temperature change. As the construction of high-grade roads in cold regions is in urgent need, and the existing heat pipe and composite embankment are limited by their cooling range and affected by the remarkable on-way energy attenuation in the ventilation slab in the road with ventilation slab, the differential deformation of various roads is still obvious, which is difficult to meet the high standard requirements of high-grade roads. Therefore, a composite embankment structure provided by the present disclosure not only can provide a basic function of cooling, but also can solve the complex problems such as limited scope and significant on-way energy attenuation in a ventilation slab of a road with the ventilation slab.

It should be noted that the embankment 300 is divided into a prevailing wind direction side 310 and a weak wind side 320 according to different local wind directions, and the prevailing wind direction side 310 and the weak wind side 320 are determined according to the wind direction of the wind on both slope sides of the embankment, and are related to the embankment strike, embankment height and local wind direction. The side with large wind energy is the prevailing wind direction side 310, and the side with small wind energy is the weak wind side 320.

Figure 1:
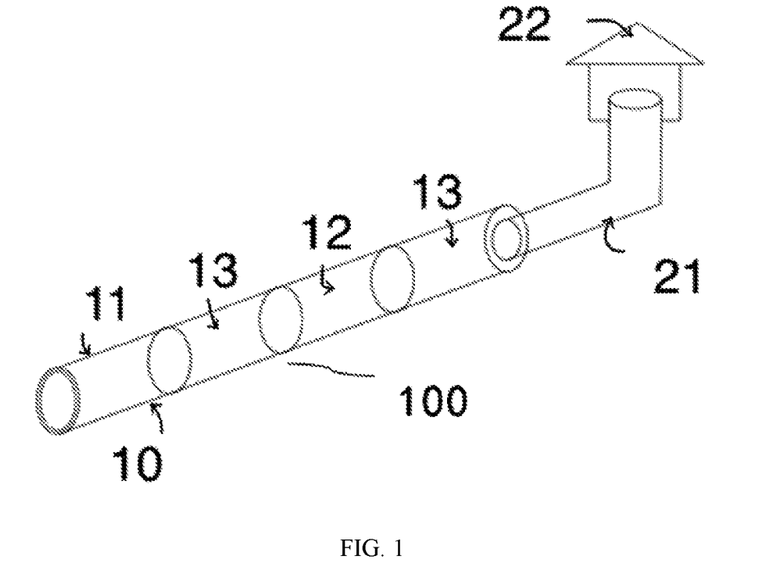
FIG. 1 is a schematic diagram of an airflow-enhanced ventilation slab in accordance with an embodiment of the present disclosure.
Figure 2:
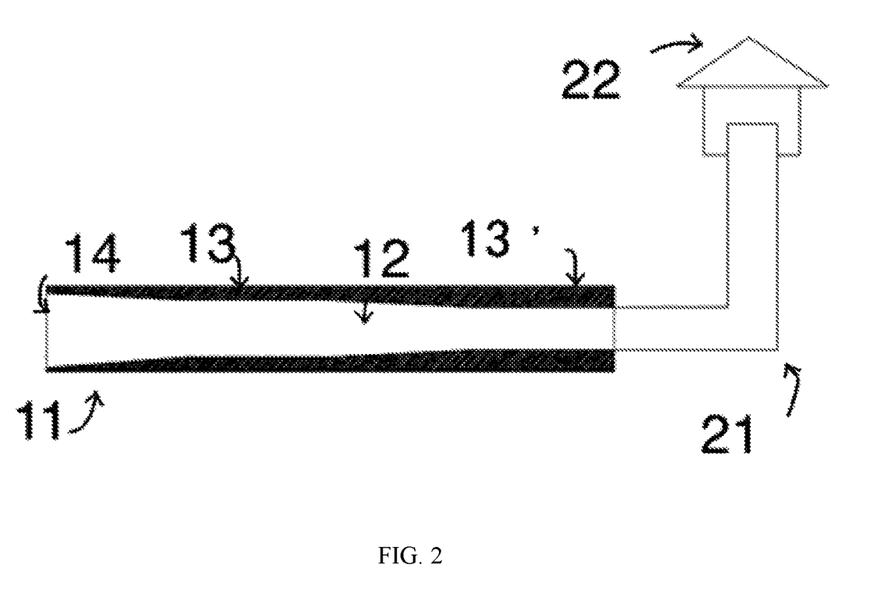
FIG. 2 is a cross-sectional view of an airflow-enhanced ventilation slab in accordance with an embodiment of the present disclosure.

As shown in FIG. 1 and FIG. 2, an airflow-enhanced embankment ventilation structure is provided according to an example of the present disclosure, including a ventilation slab 1000, and a negative pressure air suction device. The ventilation slab 1000 is arranged in an embankment 300 and includes more than one airflow-enhanced ventilation hole 100. The airflow-enhanced ventilation hole 100 includes a ventilation hole body 10 arranged in a first direction, a diameter of the ventilation hole body 10 decreases in a designated direction, the ventilation hole body 10 includes a horn end 14, a first acceleration section 11 and a first smooth section 13 arranged in sequence in the designated direction, and the designated direction is a direction from a prevailing wind direction side 310 to a weak wind side 320 of the embankment. The negative pressure air suction device is arranged at the weak wind side 320 of the embankment 300 and communicates with the ventilation hole body 10.

The ventilation hole body 10 is used for reducing on-way energy dissipation of ambient low-temperature airflow in the ventilation hole body, and includes a first acceleration section 11, a second acceleration section 12, a smooth section 13 and a horn end 14 arranged in an axial direction. The horn end 14 is arranged on the prevailing wind direction side 310 of the ventilation hole body 10 to ensure that the ambient low-temperature airflow can enter the ventilation hole body 10. The first acceleration section 11 is arranged at and connected to the other side of the horn end 14, and is used for improving a cooling function of the ventilation hole 100. The second acceleration section 12 is arranged at a side far away from the first acceleration section 11 to ensure that the cold energy can continue to play its role in the airflow-enhanced ventilation hole 100. The smooth section 13 is located between the first acceleration section 11 and the second acceleration section 12 to ensure the flow of cold air in the ventilation hole 100. The first acceleration section 11 and the second acceleration section 12 are respectively arranged at both ends in an axial direction of the ventilation hole body 10 to improve the cooling function of the ventilation hole 100. The lengths of the first acceleration section 11 and the second acceleration section 12 can be equal or unequal according to the actual wind speed difference between both ends of the embankment.

The negative pressure air suction device is provided at one end of the ventilation hole with a small caliber, and is used for enhancing the forced convection cooling effect of the airflow in the airflow-enhanced ventilation hole 100 of the ventilation slab 1000.

The negative pressure air suction device also includes a wind-driven hood 22, and a ventilation pipe 21.

The ventilation pipe 21 is connected to the airflow-enhanced ventilation hole 100 at a weak wind side slope 320 to better drive the flow of wind energy inside the airflow-enhanced ventilation hole 100. The wind-driven hood 22 is connected to the other end of the ventilation pipe 21 and is higher than a pavement, thus enhancing the forced convection cooling effect of the airflow in the airflow-enhanced ventilation hole 100 of the ventilation slab 1000.

In this embodiment, referring to FIG. 2, the first acceleration section 11 and the second acceleration section 12 are of unequal wall thicknesses, but the smooth section 13 connected thereto is of equal wall thickness, and the same wall thickness ensures that the cooling effect on the pavement is the same when the low-temperature air flows therein.

In some embodiments, the ventilation hole body 10 may also include only a first acceleration section 11, a smooth section 13, and a horn end 14. The first acceleration section 11 is connected to the horn end 14, the smooth section 13 can enable the first acceleration section 11 to communicate with the negative pressure air suction device.

Further, please continue to refer to FIG. 2, multiple smooth sections 13 may be provided to further increase the internal and external heat exchange area of the ventilation slab 1000 and strengthen the working efficiency of the ventilation slab 1000. During specific implementation, the ventilation hole body 10 specifically includes a horn end 14, a first acceleration section 11, a first smooth section 13, a second acceleration section 12 and a second smooth section 13' arranged in sequence in a designated direction. A caliber of the horn end 14 is denoted as d0, a minimum caliber of the first acceleration section 11 is denoted as d1, a caliber of the first smooth section 13 is denoted as d1, a minimum caliber of the second acceleration section 13' is denoted as d2, a caliber of the second smooth section is denoted as d2, a length of the first acceleration section 11 is denoted as l1, a length of the first smooth section 13 is denoted as l2, a length of the second acceleration section 12 is denoted as l3, a length of the second smooth section 13' is denoted as l4, and a length and a caliber of any position of the ventilation hole body are denoted as l and d, respectively, and d and l satisfy the following relationship:

$$d = \begin{cases} d0 - \dfrac{(d0-d1)l}{l1}, & (0 \le l \le l1) \\ d1, & (l1 \le l < l1 + l2) \\ d1[l-(l1+l2)]\dfrac{(d1-d2)}{l3}, & (l1+l2 \le l < l1+l2+l3) \\ d2, & (l1+l2+l3 \le l \le l1+l2+l3+l4) \end{cases}$$

Meanwhile, the arrangement of the smooth section 13 increases the length of the airflow-enhanced ventilation hole 100, such that the ventilation slab 1000 can adapt to the embankment 300 with a large width distance between the prevailing wind direction side 310 and the weak wind side 320, making the application range of the ventilation slab 1000 wider. In some embodiments, the airflow-enhanced ventilation hole 100 may also include only one smooth section 13.

In this embodiment, the ventilation slab 1000 includes multiple airflow-enhanced ventilation holes 100 arranged at intervals, and a negative pressure air suction device. The airflow-enhanced ventilation holes 100 are arranged at intervals in a direction perpendicular to an extending direction of the heat pipe 1000, and a spacing between two adjacent ventilation holes 100 is from 0.25 m to 0.5 m. Certainly, the number of the airflow-enhanced ventilation holes 100 and the spacing between the airflow-enhanced ventilation holes 100 may be appropriately adjusted according to actual needs and the size of the embankment 300. The ventilation slab 1000 shown in this embodiment includes two airflow-enhanced ventilation holes 100, and in other embodiments, the ventilation slab 1000 may also include one, three, or more airflow-enhanced ventilation holes 100.

In practical engineering, the ventilation hole body 10 of the airflow-enhanced ventilation hole 100 is arranged perpendicular to a road driving direction with respect to the embankment 300, the first acceleration section 11 and the second acceleration section 12 are located within the embankment 300, and the horn end 14 and a negative pressure device end extend out from the prevailing wind direction side 310 and the weak wind side 320 of the embankment, respectively, and are exposed to the environment.

Figure 5:
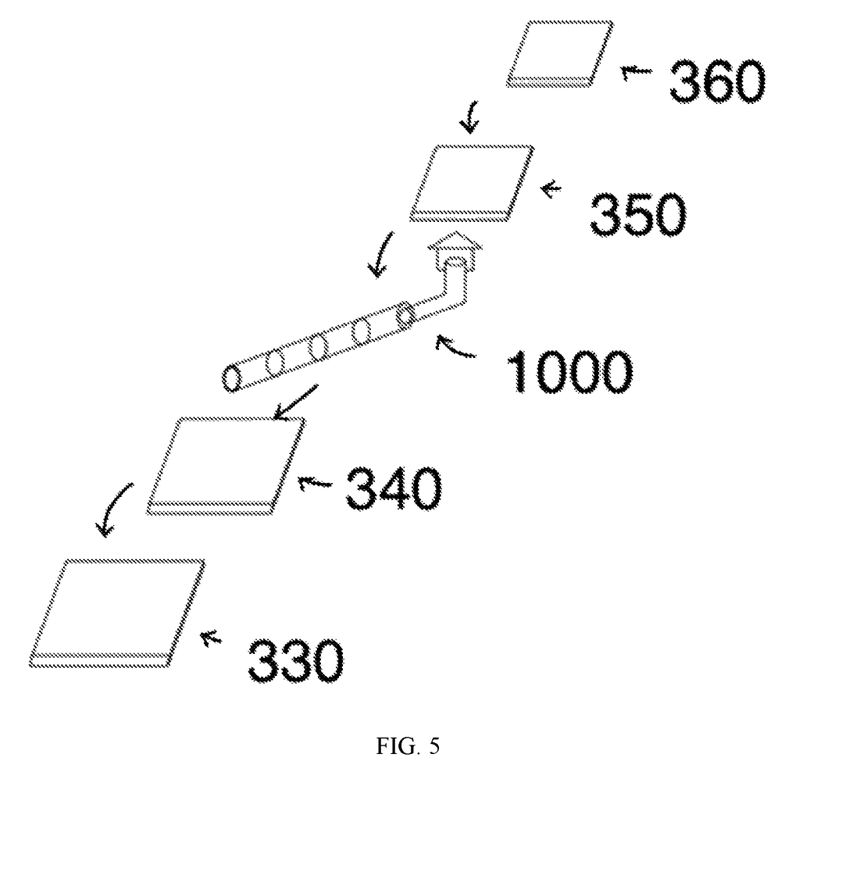
FIG. 5 is a construction schematic diagram of a composite embankment structure of an embankment.

It is also provided a composite embankment structure according to an example of the present disclosure. The composite embankment structure includes an embankment 300, the airflow-enhanced embankment ventilation structure, and a heat pipe system. As shown in FIG. 5, the embankment 300 includes an embankment filler layer 330, a ventilation slab lower leveling layer 340, a ventilation slab upper cushion 350 and a pavement structure layer 360 arranged in sequence from bottom to top. A ventilation slab 1000 in the airflow-enhanced embankment ventilation structure is arranged between the ventilation slab lower leveling layer 340 and the ventilation slab upper cushion 350. The heat pipe system includes more than one heat pipe 200, one end of the heat pipe 200 is inserted into an embankment from an embankment slope and is located under the ventilation slab 1000. The heat pipe 200 includes an evaporation section and a condensation section connected in sequence. The evaporation section is wrapped inside the embankment, the condensation section is exposed outside the embankment. The condensation section of the heat pipe 200 extends from a slope of the embankment 300 at a prevailing wind direction side 310 or a weak wind side 320, and the heat pipe 200 is an inclined inserting type heat pipe, or an L-shaped heat pipe.

The arrangement of the heat pipe 200 in the example of the present disclosure can strengthen the refrigeration in the middle part of the embankment 300, and the insertion from a slope position of the embankment 300 can effectively achieve the cooling of the deep permafrost, thereby reducing the thaw settlement at the middle part of the road, and inhibiting the creep deformation of the deep permafrost.

In practical engineering, the embankment 300 includes multiple heat pipes 200 arranged at intervals, the heat pipes 200 are arranged at intervals in a pavement extending direction, and a spacing between two adjacent heat pipes 200 is from 2.0 m to 4.0 m. Certainly, the number of the heat pipes 200 and the spacing between the heat pipes 200 can be appropriately adjusted according to actual needs and the size of the embankment 300. The composite embankment structure shown in this embodiment includes two heat pipes 200. In other embodiments, the composite embankment structure may also include one, three or more heat pipes 200.

Figure 3:
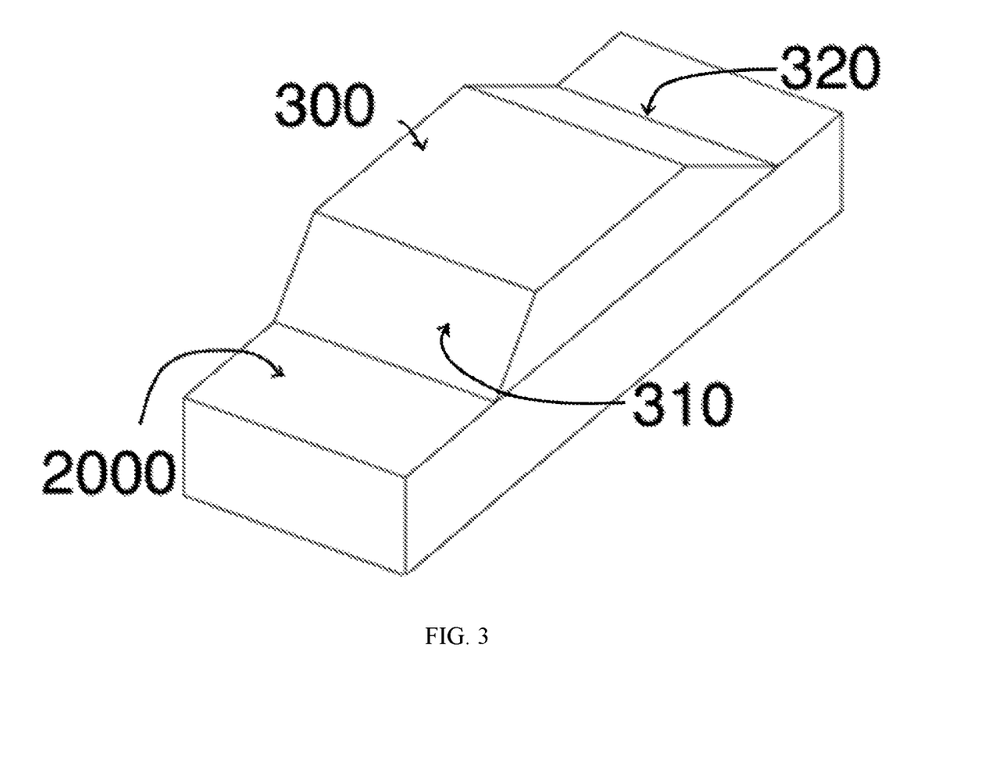
FIG. 3 is a schematic diagram of an embankment in accordance with an embodiment of the present disclosure.
Figure 4:
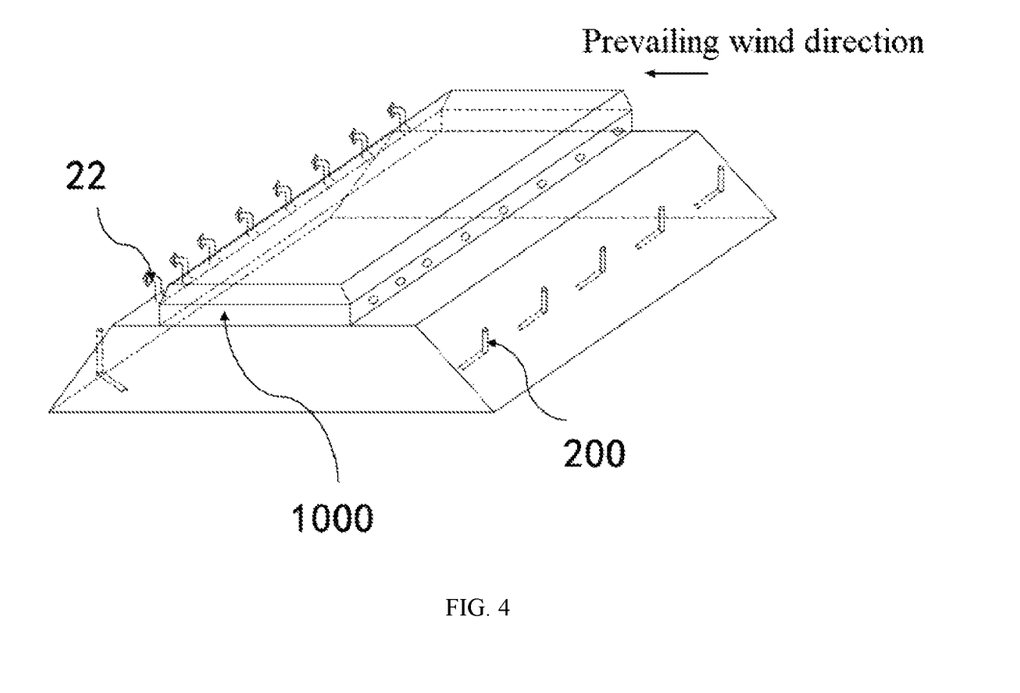
FIG. 4 is a schematic diagram of a composite embankment structure in accordance with an embodiment of the present disclosure.

As shown in FIG. 3 and FIG. 4, the embankment 300 is filled on compacted earth surface 2000 of permafrost, and the embankment 300 includes a prevailing wind direction side 310 and a weak wind side 320, and the prevailing wind direction side 310 and the weak wind side 320 are subjected to different ambient cold wind energy. The ventilation slab 1000 is horizontally arranged in an arrangement direction of the prevailing wind direction side 310 and the weak wind side 320, and the first acceleration section 11, the second acceleration section 12 and the smooth section 13 are buried in an embankment 300 with shady and sunny slopes, and the horn end 14, the ventilation pipe 21 and the hood 22 are all exposed to the environment. In a prevailing wind direction season, cold energy enters from the horn end 14 of the airflow-enhanced ventilation hole and reaches the first acceleration section 11. At this time, the diameter of the ventilation hole 100 decreases gradually, the on-way energy dissipation after the ambient low-temperature airflow enters the ventilation hole 100 is reduced, and the airflow velocity is gradually increased, thus improving the forced convection heat exchange capacity and weakening the uneven cooling caused by the on-way energy dissipation. Meanwhile, the ventilation hole 100 is connected to the negative pressure air suction device through the ventilation pipe 21. Generally, the wind-driven hood 22 is arranged on the pavement, thus enhancing the forced convection cooling effect of the airflow in the ventilation hole 100 of the ventilation plate 1000.

It is provided a process for prefabricating and curing a ventilation slab 1000 according to an embodiment of the present disclosure, including:

building a ventilation slab 1000 casting formwork, then installing a forming pipeline of an airflow-enhanced ventilation hole 100 in the ventilation slab 1000 casting formwork, and then casting and curing a ventilation slab 1000 unit body on the formwork.

It is provided a construction method for a composite embankment structure according to an embodiment of the present disclosure. The method includes the following steps:

As shown in FIG. 5, original earth surface 2000 is cleaned, a foundation is tamped, and a first layer of embankment filler 330 is paved on the earth surface 2000, and then is rolled until the compaction degree reaches the standard. Then, a first layer of medium coarse sand cushion is paved on the first layer of embankment filler 330 as a ventilation slab lower leveling layer 340, where a gravel particle size is not more than 10 mm, the mud content is not more than 5%, and a compacted thickness is 0.1 m. Ventilation slabs 1000 are distributed on the ventilation slab lower leveling layer 340 at intervals, and adjacent ventilation slabs 1000 can be connected by flat joint or embedded lapping. After the laying is finished, a ventilation slab 1000 upper cushion 350 is paved and rolled on the ventilation slab 1000, and then a pavement structure layer 360 is constructed. According to the construction method for the composite embankment structure provided by the present disclosures, the problem that the position where the ventilation slab cannot be accurately arranged in the existing ventilation slab arrangement method is solved, the close contact between the embankment and the ventilation slab is achieved, and the problem of uneven embankment deformation caused by the existing ventilation slab installation technology is overcome. The first layer of embankment filler 330, the ventilation slab lower leveling layer 340, the ventilation slab upper cushion 350 and the pavement structure layer 360 constitute the embankment 300 with sunny and shady slopes.

According to the ventilation slab 1000, the heat pipe 200, the composite embankment structure and a construction technology for the composite embankment structure provided by the embodiments of the present disclosure, the structure of the ventilation slab 1000 can flexibly control the effective working length of the ventilation slab 1000 according to actual needs. The embankment system with the ventilation slab 1000 is used in permafrost regions, and under the joint action of the ventilation hole 100 and the negative pressure air suction device 20, the cooling efficiency of the ventilation slab 1000 is strengthened, the problems of differential deformation of various roads due to the fact that the existing heat pipe and composite embankment are limited by their cooling range and affected by the remarkable on-way energy attenuation in the ventilation slab in the road with ventilation slab are solved, and thus the long-term stability of the embankment is improved.

In addition, the inventors of this case also conducted tests with reference to the foregoing embodiments with other raw materials, process operations, and process conditions described herein, all of which obtained relatively satisfactory results.

Although the present disclosure has been described with reference to illustrative embodiments, those skilled in the art should appreciate that various other changes, omissions and/or additions may be made without departing from the spirit and scope of the present disclosure, and substantial equivalents may be substituted for elements of the described embodiments. Additionally, many modifications may be made without departing from the scope of the present disclosure to make a particular situation or material adapt to the teachings of the present disclosure. Therefore, this document is not intended to limit the present disclosure to execute the specific embodiments disclosed by the present disclosure, but is intended to make the present disclosure include all embodiments falling within the scope of the appended claim. Furthermore, unless specifically stated, any use of the terms first, second, etc. does not indicate any order or importance, but is to distinguish one element from another.

What is claimed is:

1. An airflow-enhanced embankment ventilation structure, comprising:
    a ventilation slab, arranged in an embankment and comprising more than one airflow-enhanced ventilation hole, wherein the airflow-enhanced ventilation hole comprises a ventilation hole body arranged in a first direction, a diameter of the ventilation hole body decreases in a designated direction, and the designated direction is a direction from a prevailing wind direction side to a weak wind side of the embankment; and
    a negative pressure air suction device, arranged on the weak wind side of the embankment and communicating with the ventilation hole body;
    wherein the ventilation hole body comprises a horn end, a first acceleration section, a first smooth section and a second acceleration section arranged in sequence in the designated direction; the first acceleration section and the second acceleration section are of unequal wall thicknesses, the first smooth section is of an equal wall thickness, and a minimum caliber of the first acceleration section is same as a caliber of the first smooth section; and
    the horn end of the ventilation hole body and the negative pressure air suction device are exposed from the prevailing wind direction side and the weak wind side of the embankment, respectively.

2. The airflow-enhanced embankment ventilation structure according to claim 1, wherein the ventilation hole body comprises a second acceleration section, and a second smooth section arranged in sequence in the designated direction, wherein a caliber of the horn end is denoted as d0, a minimum caliber of the first acceleration section is denoted as d1, a caliber of the first smooth section is denoted as d1, a minimum caliber of the second acceleration section is denoted as d2, a caliber of the second smooth section is denoted as d2, a length of the first acceleration section is denoted as l1, a length of the first smooth section is denoted as l2, a length of the second acceleration section is denoted as l3, a length of the second smooth section is denoted as l4, a length and a caliber of any position of the ventilation hole body are denoted as l and d, respectively, and d and l satisfy the following relationship:

$$d = \begin{cases} d0 - \dfrac{(d0-d1)l}{l1}, & (0 \le l \le l1) \\ d1, & (l1 \le l < l1+l2) \\ d1[l-(l1+l2)]\dfrac{(d1-d2)}{l3}, & (l1+l2 \le l < l1+l2+l3) \\ d2, & (l1+l2+l3 \le l \le l1+l2+l3+l4) \end{cases}.$$

3. The airflow-enhanced embankment ventilation structure according to claim 2, wherein the designated direction is perpendicular to a road driving direction.

4. The airflow-enhanced embankment ventilation structure according to claim 1, wherein the ventilation slab is arranged in the embankment in a horizontal direction and distributed at a position under a cement stabilized layer of a pavement structure.

5. The airflow-enhanced embankment ventilation structure according to claim 4, wherein the ventilation slab comprises a plurality of airflow-enhanced ventilation holes arranged at intervals in a direction perpendicular to the designated direction, and a spacing between adjacent airflow-enhanced ventilation holes is from 0.25 m to 0.5 m.

6. The airflow-enhanced embankment ventilation structure according to claim 1, wherein the negative pressure air suction device comprises a wind-driven hood and a ventilation pipe, wherein one end of the ventilation pipe communicates with the ventilation hole body, and the other end of the ventilation pipe is provided with the wind-driven hood; and the wind-driven hood is higher than a pavement.

7. A composite embankment structure, comprising an embankment, the airflow-enhanced embankment ventilation structure according to claim 1, and a heat pipe system;
the embankment comprises an embankment filler layer, a ventilation slab lower leveling layer, a ventilation slab upper cushion and a pavement structure layer arranged in sequence from bottom to top;
the ventilation slab in the airflow-enhanced embankment ventilation structure is arranged between the ventilation slab lower leveling layer and the ventilation slab upper cushion; and
the heat pipe system comprises more than one heat pipe, wherein one end of the heat pipe is inserted into the embankment from an embankment slope and is located under the ventilation slab.

8. The composite embankment structure according to claim 7, wherein the heat pipe comprises an evaporation section and a condensation section connected in sequence, wherein the evaporation section is wrapped inside the embankment, and the condensation section is exposed outside the embankment.

9. The composite embankment structure according to claim 7, wherein the heat pipe system comprises a plurality of heat pipes arranged at intervals along an embankment strike, and a spacing between adjacent heat pipes is from 2.0 m to 4.0 m.

10. The composite embankment structure according to claim 9, wherein the heat pipe comprises an inclined inserting type heat pipe or an L-shaped heat pipe.

11. The composite embankment structure according to claim 8, wherein the condensation section of the heat pipe extends from a slope of the embankment at the prevailing wind direction side or the weak wind side.

12. A construction method for the composite embankment structure according to claim 7, comprising the following steps:
filling the embankment filler layer;
laying the ventilation slab lower leveling layer on the embankment filler layer;
assembling a prefabricated ventilation slab on the ventilation slab lower leveling layer;
laying the ventilation slab upper cushion and the pavement structure layer on the ventilation slab in sequence; and
arranging the negative pressure air suction device in cooperation with the ventilation slab to form the airflow-enhanced embankment ventilation structure.

13. The construction method for the composite embankment structure according to claim 12, further comprising the following steps:
inserting one end of more than one heat pipe into the embankment from the embankment slope and under the ventilation slab.

14. The construction method for the composite embankment structure according to claim 13, further comprising a step of prefabricating and curing the ventilation slab:
building a ventilation slab casting formwork, then installing a forming pipeline of an airflow-enhanced ventilation hole in the ventilation slab casting formwork, and then casting and curing a ventilation slab unit body on the ventilation slab casting formwork.

15. The composite embankment structure according to claim 7, wherein in the airflow-enhanced embankment ventilation structure, the ventilation hole body comprises a second acceleration section, and a second smooth section arranged in sequence in the designated direction, wherein a caliber of the horn end is denoted as d0, a minimum caliber of the first acceleration section is denoted as d1, a caliber of the first smooth section is denoted as d1, a minimum caliber of the second acceleration section is denoted as d2, a caliber of the second smooth section is denoted as d2, a length of the first acceleration section is denoted as l1, a length of the first smooth section is denoted as l2, a length of the second acceleration section is denoted as l3, a length of the second smooth section is denoted as l4, a length and a caliber of any position of the ventilation hole body are denoted as l and d, respectively, and d and l satisfy the following relationship:

$$d = \begin{cases} d0 - \dfrac{(d0-d1)l}{l1}, & (0 \le l \le l1) \\ d1, & (l1 \le l < l1 + l2) \\ d1[l-(l1+l2)]\dfrac{(d1-d2)}{l3}, & (l1+l2 \le l < l1+l2+l3) \\ d2, & (l1+l2+l3 \le l \le l1+l2+l3+l4) \end{cases}$$

16. The composite embankment structure according to claim 15, wherein in the airflow-enhanced embankment ventilation structure, the designated direction is perpendicular to a road driving direction.

17. The composite embankment structure according to claim 7, wherein in the airflow-enhanced embankment ventilation structure, the ventilation slab is arranged in the embankment in a horizontal direction and distributed at a position under a cement stabilized layer of a pavement structure.

18. The composite embankment structure according to claim 17, wherein in the airflow-enhanced embankment ventilation structure, the ventilation slab comprises a plurality of airflow-enhanced ventilation holes arranged at intervals in a direction perpendicular to the designated direction, and a spacing between adjacent airflow-enhanced ventilation holes is from 0.25 m to 0.5 m.

19. The composite embankment structure according to claim 7, wherein in the airflow-enhanced embankment ventilation structure, the negative pressure air suction device comprises a wind-driven hood and a ventilation pipe, wherein one end of the ventilation pipe communicates with the ventilation hole body, and the other end of the ventilation pipe is provided with the wind-driven hood; and the wind-driven hood is higher than a pavement.

20. The composite embankment structure according to claim 8, wherein the heat pipe system comprises a plurality of heat pipes arranged at intervals along an embankment strike, and a spacing between adjacent heat pipes is from 2.0 m to 4.0 m.

* * * * *